No. 690,917. Patented Jan. 14, 1902.
C. W. BILDT.
APPARATUS FOR CONTINUOUS ROLLING DIRECT FROM FLUID METAL.
(Application filed Oct. 14, 1899.)
(No Model.) 5 Sheets—Sheet 1.
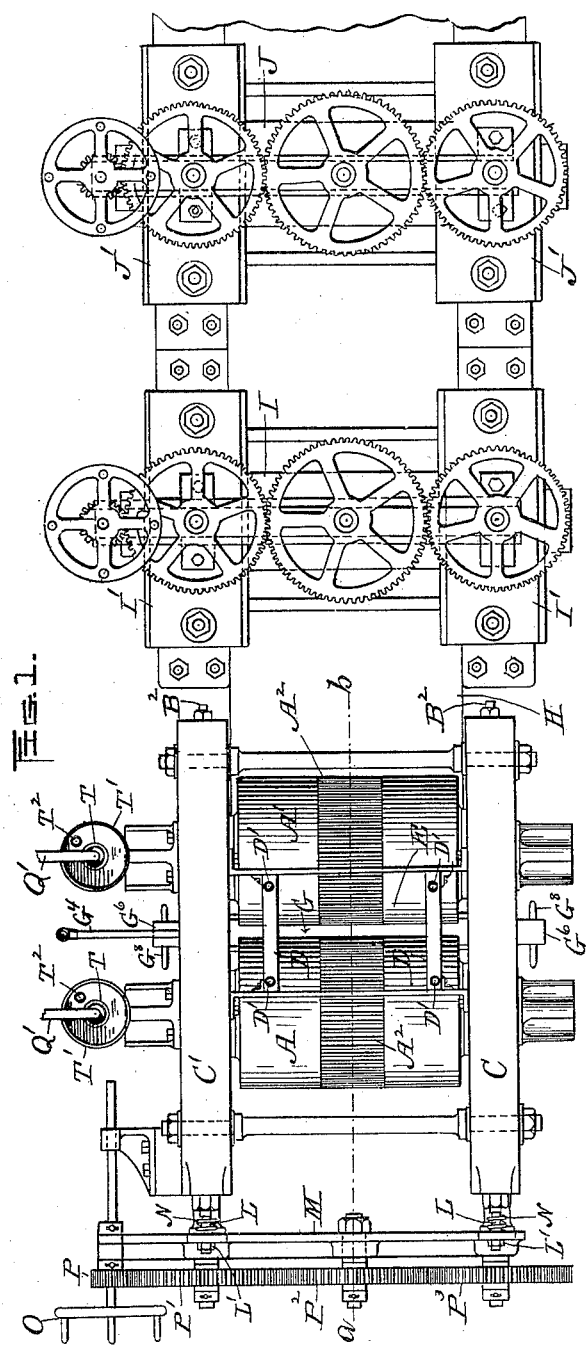
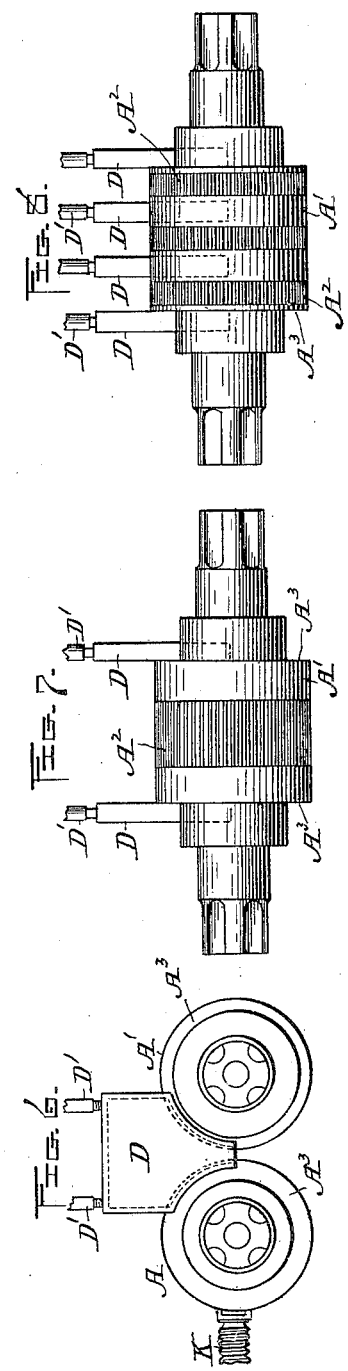
Witnesses:
W. B. Nourse.
A. H. Gilbert.
Inventor:
Carl Wilhelm Bildt
By A. A. Barker. Atty.

No. 690,917. Patented Jan. 14, 1902.
C. W. BILDT.
APPARATUS FOR CONTINUOUS ROLLING DIRECT FROM FLUID METAL.
(Application filed Oct. 14, 1899.)
(No Model.) 5 Sheets—Sheet 2.
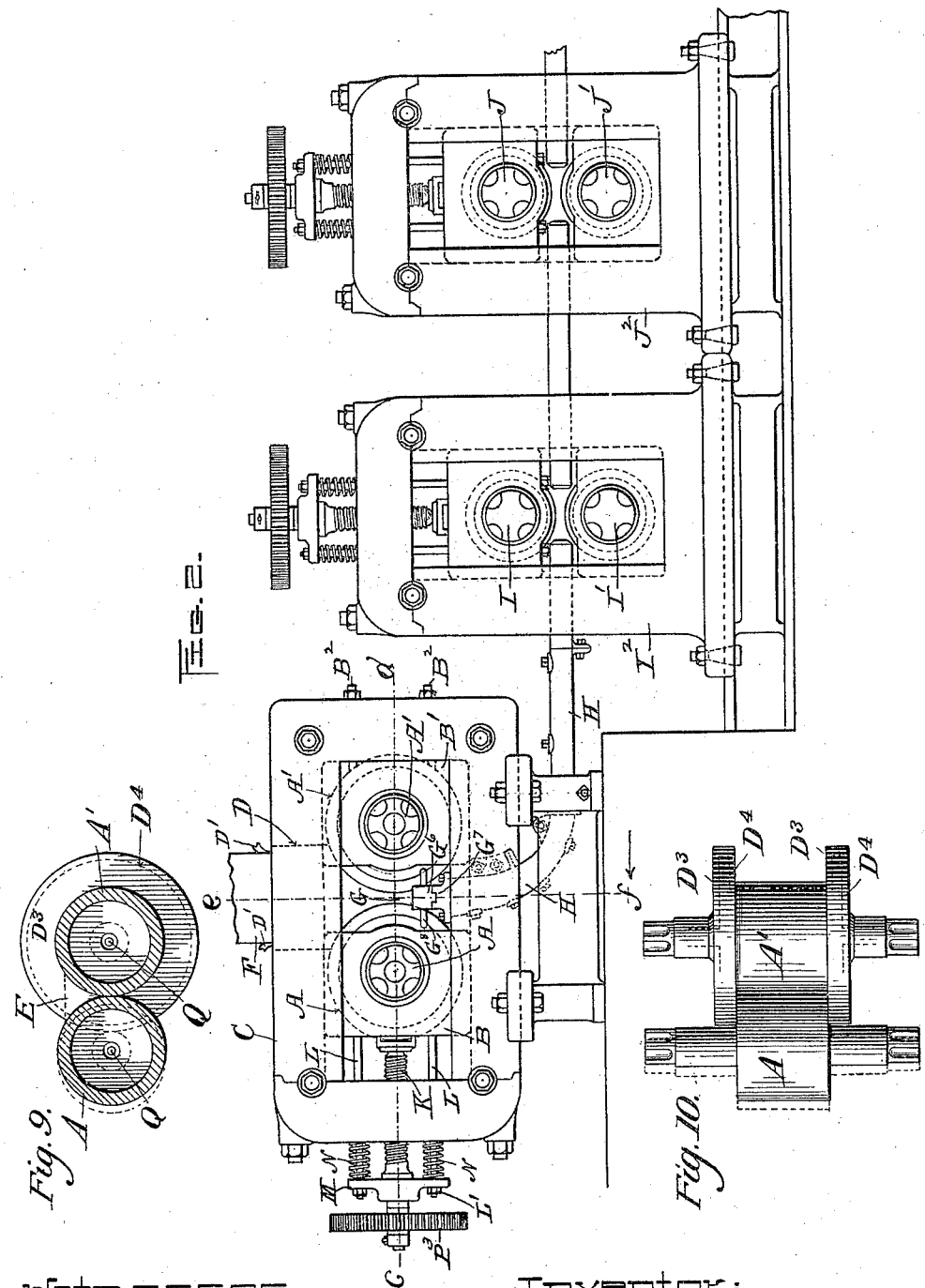
Witnesses:
W. B. Nourse.
A. A. Gilbert.
Inventor:
Carl Wilhelm Bildt
By A. A. Barker, Att'y.

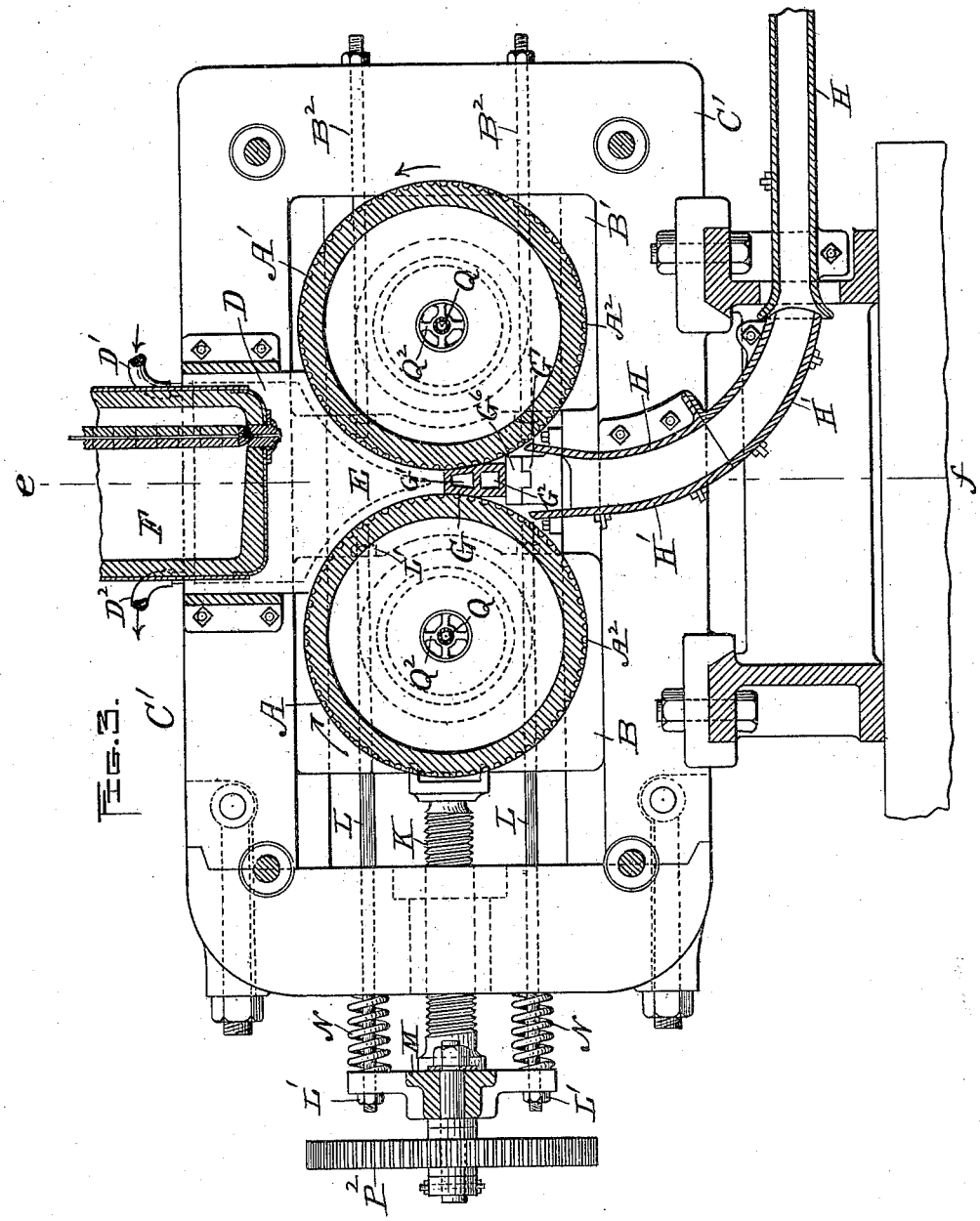

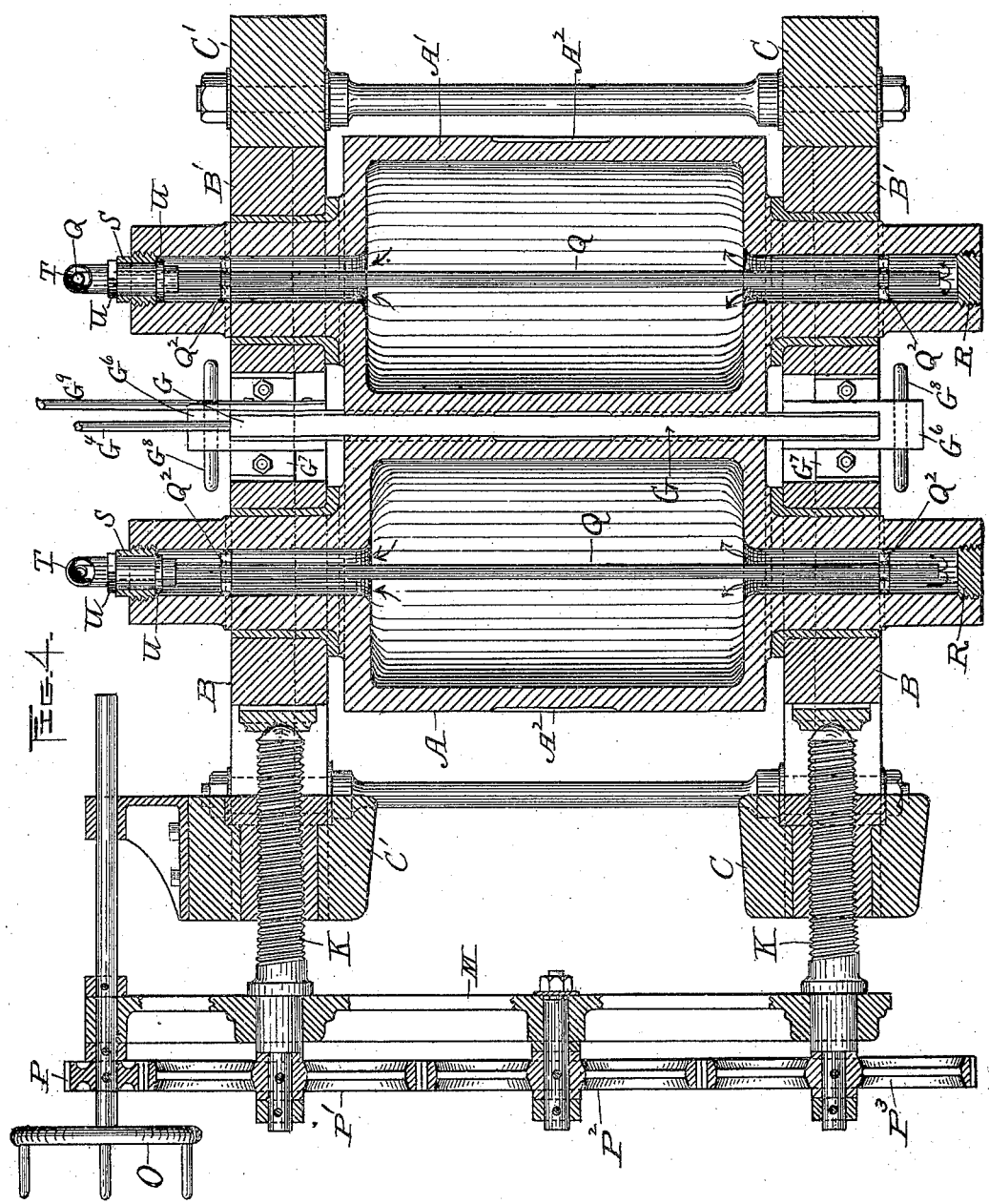

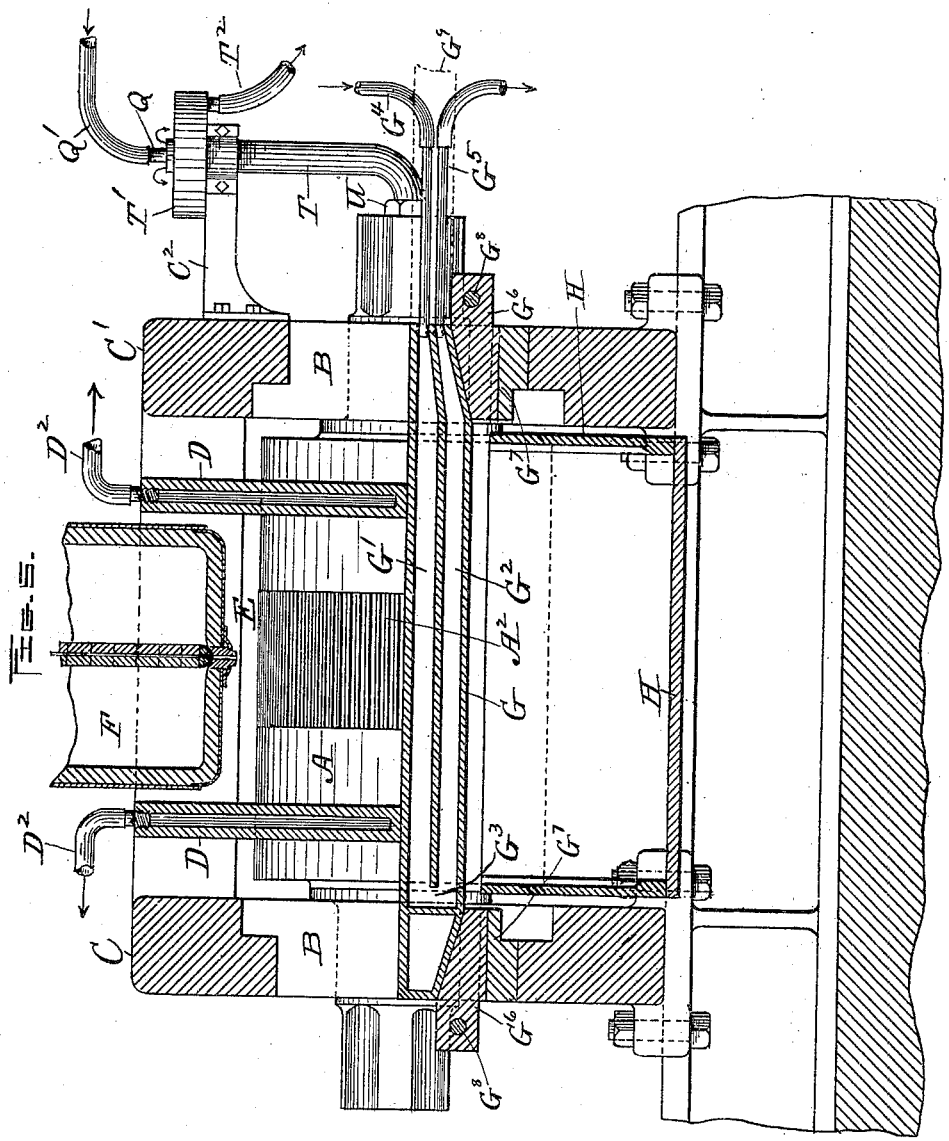

UNITED STATES PATENT OFFICE.

CARL WILHELM BILDT, OF WORCESTER, MASSACHUSETTS.

APPARATUS FOR CONTINUOUS ROLLING DIRECT FROM FLUID METAL.

SPECIFICATION forming part of Letters Patent No. 690,917, dated January 14, 1902.

Application filed October 14, 1899. Serial No. 733,602. (No model.)

*To all whom it may concern:*

Be it known that I, CARL WILHELM BILDT, of the city and county of Worcester and State of Massachusetts, have invented certain new and useful Improvements in Apparatus for Continuous Rolling Direct from Fluid Metal; and I do hereby declare that the following is a full, clear, and exact description thereof, reference being had to the accompanying drawings, forming a part of this specification, and in which—

Figure 1 represents a top or plan view of my aforesaid improved apparatus, in connection with which are also shown two pairs of rolls and housings of a continuous rolling-mill. Fig. 2 is a front side view of the parts shown in Fig. 1. Fig. 3 represents, upon an enlarged scale, a central vertical longitudinal section, partly in elevation, of the apparatus, taken on line $a\,b$, Fig. 1. All the following figures, except the last five, are also upon the same enlarged scale. Fig. 4 is a horizontal section taken on line $c\,d$, Fig. 2. Fig. 5 is a vertical transverse section, partly in elevation, taken at the points indicated by lines $e\,f$, Figs. 2 and 3. Fig. 6 represents an end view of the first pair of rolls and transverse partitions above the same which form a trough into which the molten metal is poured, said figure showing a modification in the construction, which will be hereinafter described. Fig. 7 is a side view of the rolls and transverse partitions shown in Fig. 6. Fig. 8 is a view similar to Fig. 7, showing another modification in the construction, which will also be hereinafter described; and Figs. 9 and 10 represent a transverse section and plan view, respectively, of the first two rolls, showing still another modification in the construction, which will be hereinafter described.

My invention relates more especially to the manufacture of what is known as "Bessemer" open-hearth and crucible steel, but may also be employed for copper, brass, bronze, and all kinds of metals.

The object of said invention is to provide an apparatus whereby plates, bars, billets, and other desired shapes of metal may be rolled direct from the fluid metal.

I am aware that it is not broadly new to roll iron and steel direct from the fluid metal, many patents having been issued for carrying out in different ways a similar result, and I therefore, in view of said prior state of the art, limit my invention to an apparatus constructed substantially as herein set forth and shown.

My said invention comprises, in combination, a pair of artificially-cooled rolls whose peripheries are preferably corrugated longitudinally or otherwise roughened over a portion of their surfaces, artificially-cooled transverse partitions extending up from the peripheries of said pair of rolls to form, in connection with the upper surfaces of the rolls, a trough or troughs to receive and hold the molten metal poured therein from the usual ladle arranged above the same, a removable plug or stopper, preferably artificially cooled and extending from one side to the other of the machine, between and below the horizontal center of the aforesaid pair of rolls, and a pipe or guide for conducting the metal from said pair of rolls to the rolls of a rolling-mill or other desired point to be further treated, as will be hereinafter more fully set forth.

The method of rolling direct from the fluid metal has not proved satisfactory in practice and has therefore not been adopted except to a limited extent. The most common way of rolling steel has been to first pour the molten metal into molds to form the ingots, which are then "stripped," reheated, and finally rolled into the desired shape. By this method in treating the finer sizes the steel must be reheated two or more times during the process of rolling, and the ingots are apt to be unsound, being generally "piped" and containing more or less "blowholes." They are also uneven in composition, due to segregation. This is especially the case when the molten metal is poured into large ingots on account of the longer time required in cooling, segregation, it will be understood, increasing with the time required in cooling. Another objection to said old method is that the bars or other shapes of rolled steel require much "cropping," the croppings being at least twice the number of ingots produced from each heat. This results in a large loss of metal and also requires a large amount of unnecessary labor and machinery.

To overcome the foregoing objections is the main purpose of my aforesaid invention. This I do by adopting the construction and arrangement herein set forth and shown, which I will now describe in detail with reference to the accompanying drawings.

In said drawings, A A' represent a pair of parallel transversely-arranged horizontal rolls fitted to turn in suitable bearings B B B' B', mounted in the horizontally-arranged housings C C'. The parts marked D D are the vertical partitions previously alluded to, which are arranged transversely to the rolls and extend up from the peripheral surfaces thereof, the lower ends of said transverse partitions being fitted to said peripheral surfaces of the rolls, as is shown in Figs. 2, 3, and 5 of the drawings, thus forming a trough or receptacle E to receive the molten metal between said rolls and partitions. The molten metal is discharged therein from an ordinary ladle F, arranged above the apparatus, and which in practice may be mounted on a suitable stationary or swinging support. In this instance I have shown only a portion of the lower part of the ladle, as said ladle and its means of support constitute no part of my invention. A removable plug or stopper G is arranged between the peripheral surfaces of rolls A A', preferably just below the horizontal center thereof, as is shown in Figs. 3, 4, and 5, and extending from one side of the machine to the other, as is best shown in Fig. 5, the purpose of which will be hereinafter described. From just under said plug or stopper G a pipe or guide H extends from said rolls A A' to the first pair of rolls I I' of a continuous rolling-mill or to such other point as may be desired for further treatment. Said pipe or guide is preferably made in sections, so that it may be taken apart, and with removable covers H', so that the interior thereof may be conveniently reached, if required, for any purpose.

I have shown only two pairs of rolls and housings of a continuous rolling-mill, the rolls I I' above referred to and the rolls J J', with their respective housings I² I² and J² J², the same being deemed sufficient to illustrate the application of my invention thereto.

The bearings B' B' of roll A' are fastened rigidly in housings C C' by means of the bolts B², while the bearings B B of roll A are made adjustable in said housings, so that said roll A may be adjusted toward or from the roll A'. Said roll A may be thus adjusted by means of mechanism similar to that employed for adjusting the top rolls I J of the continuous rolling-mill, the only essential difference between the housings and adjusting mechanism of roll A and those of rolls I J being that the former are arranged horizontally and the latter vertically, as usual. Said roll-adjusting mechanism does not constitute a part of my invention, and it will therefore be necessary to give only a brief description thereof. The bearings B B of roll A are fitted to slide longitudinally in suitable guideways in housings C C'. Each bearing is adjusted and held in position by means of a central screw K and spring-rods L L at each side thereof. Said central screws are fitted to turn in suitable bearings in the ends of the housings. They are also fitted to turn at their outer ends in a cross-frame M and to bear at their inner ends against their respective bearings B B. The holding-rods L L pass through the outer edges of said bearings and cross-frame and are provided with nuts L' on both ends, which respectively bear upon the inner sides of the bearings B B and on the outer side of the cross-frame M. Between the outer end of each housing C C' and said cross-frame are arranged spiral springs N, one over each rod L.

By the above-described construction it is obvious that an inward pressure may be imparted to the bearings by turning the central screws K one way or said pressure removed by turning the same in the opposite direction and that a constant yielding tension is exerted by the rods L and springs N to draw said bearings toward said screws, so that the bearings may be readily adjusted and held in any desired position. Both screws K are arranged to be turned together by the operation of a hand-wheel O through the intermeshing gears P P' P² P³ and their supports, the gears P' and P³ being secured to the outer ends of said screws, as is shown in Fig. 4. If desired, roll A may be fitted to turn in a stationary bearing, the same as roll A'.

The rolls A A, transverse partitions D, and plug or stopper G are all made hollow and are each provided with means for maintaining a current of cold water through the same to keep them cool, and thereby cool the molten metal as quickly as possible in the pouring and rolling operation hereinafter described.

The rolls A A' are made considerably larger in diameter than ordinary reducing-rolls, so as to form a deeper trough E than would be produced by the use of said smaller rolls. Water is supplied to each of said hollow rolls A A' by means of a pipe Q, extending longitudinally therethrough from the supply-pipe Q', with which it connects at one end to nearly the outer end of the opposite hub of the roll, as is shown in Fig. 4. Said outer end is closed by a screw-plug R, and the end through which said pipe enters is provided with a hollow nut or bushing S, in which the discharge-pipe T fits, the pipe being provided with a collar or nut U at each end of said nut S to hold the pipe T from longitudinal motion therein. Said pipe T is made considerably larger than pipe Q, and the latter passes through it, as is shown in Figs. 4 and 5, leaving sufficient space between the two pipes to form an outlet from the interior of the roll for the water to discharge therefrom. In this instance pipe T is extended up from the hub of the roll and is arranged to discharge into a reservoir T' at its upper end, as is indicated by the arrows in Fig. 5. The upper end of the pipe and reservoir are supported in position by a bracket C², projecting out from housing C'. The interior smaller pipe Q extends up through pipe T beyond its upper end and is connected with the supply-pipe Q', which is preferably of rubber or other flexible material, so that it may be conveniently connected with the source of supply. The water flowing from pipe T into reservoir T' is discharged from the latter through a suitable pipe T². The pipes Q may be held in position in the rolls by circular skeleton frames Q² or other suitable means. The bushing S is adapted to turn with the roll on pipe T and being fastened in the end of the roll permits said roll to turn without interfering with the aforesaid supply and discharge pipes. The partitions D are cooled in a similar manner to the rolls by making the same hollow, as is best shown in Fig. 5, and providing each with a supply-pipe D' and discharge-pipe D² at the top of the opposite ends thereof, and the plug or stopper G is also cooled by forming upper and lower longitudinal chambers G' G² therein, connected at one end at G³ and provided at the opposite end with supply and discharge pipes G⁴ G⁵, as is shown in Figs. 3 and 5.

As previously stated, the partitions D are fitted to the peripheral surfaces of rolls A A'. Their lower ends also fit the top surface of the plug or stopper G, and the upper parts of the sides of said plug or stopper also fit the surfaces of the rolls. A tight trough E, it is obvious, is thereby formed, as previously stated, between the parallel sides of the partitions and rolls and said plug or stopper to the level of the tops of the rolls, as is best shown in Figs. 3 and 5, whose sides and ends are artificially cooled and into which the molten metal is poured directly upon the rolls from the ladle F, as previously stated. In this instance the apparatus is shown as being constructed and arranged for making wide metal plates, the width being governed by the distance that the partitions D D are arranged apart and the thickness by the width of the space between the rolls A A' at the bottom of trough E; but, if desired, other shapes of metal in cross-section—such as bars, billets, and other shapes—may be produced by making the partitions and rolls of the proper shapes and distances apart to conform therewith. Several of said different metal shapes may also be made at one time, if desired, by employing several transverse partitions, as is shown in Fig. 8. In Figs. 9 and 10 the water-cooled partition is shown as being formed integral with one of the rolls and overlapping the end of the other roll, as is shown at D³, said partition being made hollow, as is shown by dotted lines D⁴, so that the water in the roll may flow into and cool the same. This feature of artificially cooling the transverse partitions is an important one in my invention, as it is essential that the fluid metal at the ends of the trough shall be solidified at the same time and to the same degree of hardness as that at the sides coming against the rolls.

It is desirable to have the rolls A A' corrugated longitudinally at A² or otherwise roughened over a portion of their surfaces between the partitions D in order to obtain a better hold upon the metal to facilitate moving it forward when the rolls are operated; but as the same is not an essential feature I do not limit myself thereto.

The removable plug or stopper G may be temporarily held in position in various ways. In this instance I have arranged to hold it by driving wedges G⁶ under the beveled ends of said plug or stopper, as is shown in Fig. 5, said wedges being fitted to slide in suitable grooved guideways G⁷ (see Fig. 3) and provided with transverse handles G⁸ for withdrawing the same to permit of the removal of said plug or stopper.

Instead of conducting the metal from the rolls A A' to a continuous rolling-mill to be carried through all the various stages of reduction to finish the same in said mill it may be passed through only the first two rolls A A' or any number of rolls of said mill and cut into desired lengths by suitable shears, and thus finished without further treatment, or at the same heat after having been thus severed it may be further rolled, if required, to any desired size or shape.

In practice the partitions D may be adjustably fastened in position, so that they may be adjusted toward or from each other as required to produce any desired width of metal to be rolled. The rolls A A' are also in practice designed to be turned in a similar manner to the rolls of a rolling-mill, being adapted, as usual, to be clutched and unclutched to and from suitable drive-shafts or other mechanism. As no claim is made to said means for driving the rolls, it will be unnecessary to illustrate or describe the same.

While it is desirable to have the rolls A A', partitions D, and plug or stopper G constructed with water-cooling appliances attached thereto, as described and shown, it is obvious that a similar result might be accomplished by passing a cold-air blast through the same without departing from the principle of my invention.

The operation of the apparatus is as follows: Assuming that the plug or stopper G is in position, with the surfaces of rolls A A' bearing against each side thereof, the partitions D in their proper positions to form the trough E, previously described, and the means for cooling the various parts in operation, the molten metal is now allowed to discharge from ladle F into said trough and is permitted to slowly flow therein until the latter is partially filled. The metal first poured at once commences to harden at the outside next to the cooled surfaces, and by the time the trough has become filled to the proper level it is sufficiently hardened or solidified at the bottom to be rolled. The flow of metal from the ladle is then stopped, (or if a small opening is used, through which the metal discharges very slowly, it may flow continuously,) the plug or stopper withdrawn by means of the bar G⁹, and the rolls A A' set slowly in motion, thereby causing the solidified metal to be drawn down and as fast as it is compressed and leaves the rolls to be fed forward into and through the conducting-pipe or guide H and in between the first pair of rolls I I' of the continuous rolling-mill and thence through said mill to be reduced to the desired size and shape, all by a continuous automatic operation and at one heat, or it may be finished and cut apart into the desired lengths as it leaves the first rolls A A' or any other number or set of rolls, as previously described.

It will of course be understood that in order to successfully carry out the aforesaid process in practice the flow of the molten metal from ladle F must be regulated to allow sufficient time for the metal at the bottom of the trough next to the rolls and partitions to sufficiently cool and harden to be rolled or fed forward as fast as said metal is discharged into said trough. The rolls A A' and also those between which the metal subsequently passes must also be regulated to a nicety, so as to compress and carry forward the metal as fast as ready to be operated upon.

If desired, instead of stopping the flow of metal from the ladle to permit that at the bottom of the trough to partially solidify preparatory to the withdrawal of the plug or stopper G and setting in motion of rolls A A', as previously described, said discharge may be continuous after being once started by controlling the discharge so that only sufficient metal will flow in to keep the trough filled to the proper level as it solidifies and is fed forward from the bottom of said trough, as also previously described.

After the apparatus is once set in motion, as aforesaid, the process of pouring and rolling is carried on continuously to the end of the heat. Therefore no "croppings" are required except at the first and last end of the metal produced from said heat, and thereby resulting in a very large saving of metal.

It will be understood that the molten metal is not designed to be cooled throughout its whole thickness to a hard or solidified state before passing out from between the first pair of rolls A A'. Only the surface thereof next to the rolls and partitions, and at the point where it leaves the rolls are cooled and hardened to a solidified state. The interior from just above where the metal passes out from between said rolls being still in a liquid state and being compressed and rolled while in this state during the time of setting or solidifying, no vacuum on account of shrinkage can occur, all gases being also expelled therefrom by said compression, said gases being permitted to escape through the liquid portion of the metal at the top. The metal after passing from the rolls is therefore perfectly solid, sound, and free from "blowholes" and "pipes." It also on this account becomes perfectly uniform in composition all through, and it is evident, therefore, that segregation cannot take place, and being continuously poured and rolled the finished product is found to be perfectly uniform in composition. No reheating being required, a large saving in fuel is effected over the common method of using molds. The saving in labor is also very large, as all the usual manipulations between the pouring and rolling to finish the product are dispensed with. Another large saving effected is in machinery and appliances—such as cranes, cars, heating-furnaces, as well as molds—and also in the space which said machinery and appliances ordinarily occupy.

Having now described my invention, what I claim therein as new, and desire to secure by Letters Patent, is—

1. The horizontal, parallel, rotatory, rolls, in combination with the vertical partitions arranged transversely to said rolls and extending up from the peripheries thereof, the removable plug arranged longitudinally with and between the rolls, and means for cooling said rolls, partitions and plug, substantially as and for the purpose set forth.

2. The horizontal, parallel, rotatory, rolls, in combination with the vertical partitions arranged transversely to said rolls and extending up from the peripheries thereof; the removable plug arranged longitudinally with and between the rolls, the conducting pipe or guide for conducting the metal from the aforesaid rolls to the rolling-mill or other desired point, and means for cooling said rolls, partitions and plug, substantially as and for the purpose set forth.

CARL WILHELM BILDT.

Witnesses:
A. A. BARKER,
W. B. NOURSE.